G. L. BOTTUM.
PRESSURE CONTROLLING AND RELIEF VALVE FOR HOT WATER CIRCULATING SYSTEMS.
APPLICATION FILED JULY 20, 1911.
1,042,387.
Patented Oct. 29, 1912.
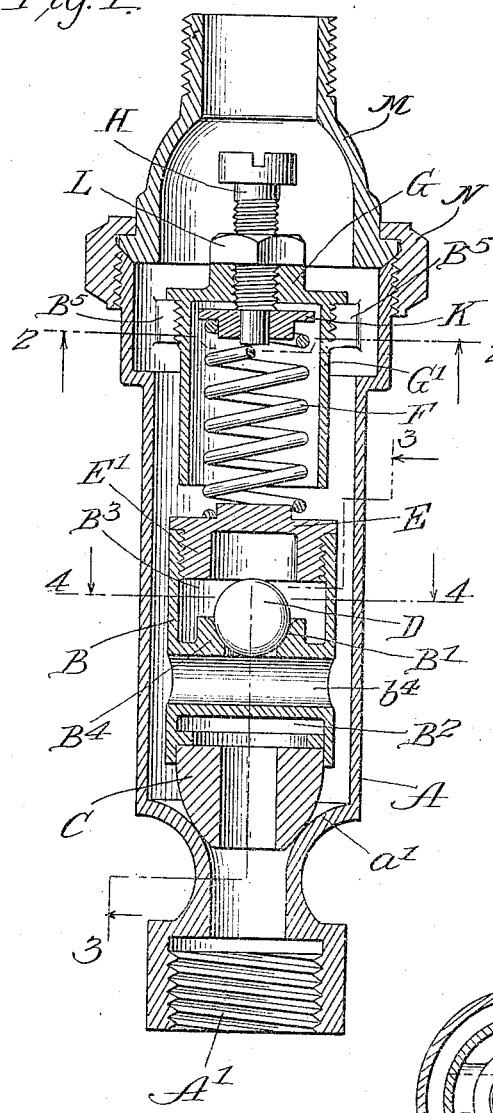
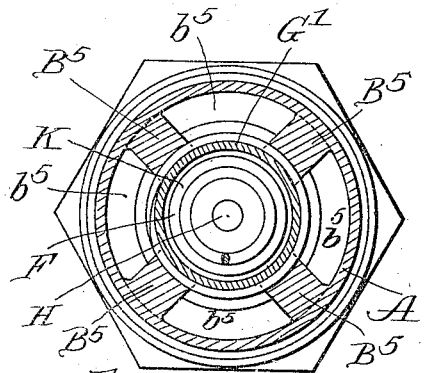
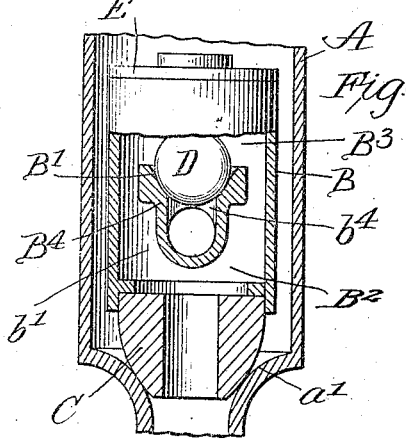
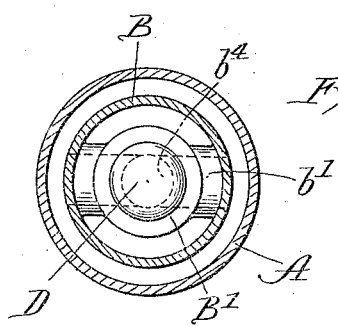
Witnesses:
P. J. Gathmann
Lucy S. Stone
Inventor:
George L. Bottum
By Burton & Burton
his Attorneys.

UNITED STATES PATENT OFFICE.

GEORGE L. BOTTUM, OF CHICAGO, ILLINOIS.

PRESSURE CONTROLLING AND RELIEF VALVE FOR HOT-WATER-CIRCULATING SYSTEMS.

1,042,387.	Specification of Letters Patent.	Patented Oct. 29, 1912.

Application filed July 20, 1911. Serial No. 639,571.

*To all whom it may concern:*

Be it known that I, GEORGE L. BOTTUM, a citizen of the United States, residing at Chicago, in the county of Cook and State of Illinois, have invented new and useful Improvements in Pressure Controlling and Relief Valves for Hot-Water-Circulating Systems, of which the following is a specification, reference being had to the accompanying drawings, forming a part thereof.

The purpose of this invention is to provide an improved valve having the function of what is commonly termed a "relief valve" for use in connection with the expansion tank of a hot water circulating system, and adapted for regulating the pressure in such system, independently of the elevation of the tank.

The invention consists in the elements and features of construction shown and described, as indicated in the claims.

In the drawings:—Figure 1 is an axial section of a device embodying this invention. Fig. 2 is a section taken on the line 2—2 of Fig. 1. Fig. 3 is a section taken on the line 3—3 of Fig. 1. Fig. 4 is a section taken on the line 4—4 of Fig. 1.

The device shown in the drawings comprises a valve body or shell, A, which contains a valve chamber and has an inlet at the lower end and an outlet at the upper end, and is provided with the connections at the opposite ends for inlet and outlet, respectively, the lower end being the inlet and designed to be connected with the hot water circulating system, the upper end being the outlet and designed for connection with the expansion tank, (not shown).

The inlet, $A^1$, is encompassed by a trumpet-shaped valve seat, $a^1$, that is, a valve seat which is funnel-shaped and inwardly and upwardly convex in radial section. In the valve chamber there is positioned a valve member, B, proportioned so as to afford water-way past it from end to end within the valve chamber. As illustrated, this valve chamber comprises a cylindrical shell having a valve terminal or seating element, C, of the valve, fixed in its lower end, said valve terminal being spheroidal in form for seating in the trumpet-shaped valve seat described. The valve member comprises a lower chamber, $B^2$, and an upper chamber, $B^3$, partially separated by a web or bridge, $B^4$, and having communication with each other past said bridge at $b^1$. The valve terminal, C, is axially apertured for communication through it from the inlet, $A^1$, to the chambers, $B^2$ and $B^3$. The bridge $B^4$, has a passage at $b^4$, which opens at both ends into the water-way within the shell, while at the middle said passage opens upwardly through the bridge, $B^4$, into the upper chamber, $B^3$, said last mentioned opening being encompassed by a valve seat, $B^1$, in which is lodged a downwardly seating check valve, D, the same being preferably a ball, as shown in the drawings.

For convenience of assembling the parts and to afford a check for the valve ball, D, the upper end of the valve member is formed by a cap-plug, E, whose annular threaded flange, $E^1$, overhangs the annular valve seat, $B^1$, and coöperates with the latter for retaining the ball valve within range of the seat. The valve member, B, is without contact upon or guidance by the shell, but is yieldingly held toward its seat by a spring, F, whose lower end bears upon the top of the valve member and whose upper end presses against a stop device which is mounted on the valve shell. This stop device comprises a collar, G, which is centrally positioned in the valve shell by means of inwardly projecting bosses, $B^5$, on the shell which are threaded on their inner faces so that the collar can be screwed into them, leaving water-ways, $b^5$, between them past the collar. The central opening of the collar is threaded and receives a threaded bolt, H, which is reduced in diameter at its lower end below the threaded portion to form a shoulder for engaging with a washer or annular follower, K, which is of suitable diameter to seat upon the upper end of the spring, F, and which is peripherally rabbeted to seat and center the upper coil of the spring. A jam nut, L, is provided on the bolt, H, above the collar and the bolt has its head slotted or otherwise adapted for rotation at will to force the follower down or up for increasing or diminishing the tension of the spring, the force of which resists the unseating of the valve terminal, C.

In order to afford a check to limit the upward or unseating movement of the valve member, B, the collar, G, is extended downward, the extension being preferably in the form of a hollow cylinder, $G^1$, outside of the spring and out of contact therewith.

overhanging the periphery of the upper end of the valve member at such distance therefrom as to permit only an amount of upward opening movement of said valve member as shall not carry the valve terminal, C, so far away from the trumpet-shaped valve seat as to permit it by any lateral deflection to be lodged upon said seat so far out of axial alinement therewith that it will not readily center itself upon the seat.

Avoidance of sticking of any of the valve parts is effected by making the valve terminal, C, of phosphor-bronze, the valve seat being of brass. The same precaution is taken with respect to the ball valve, D, which is phosphor-bronze and provided with a brass seat.

The operation of this valve will be understood by one familiar with this class of devices. The tension of the spring, F, is adjusted by the screw, H, so as to hold the valve on its seat against the maximum pressure which the conditions of the system require. This permits locating the valve at any point in the standpipe leading to the expansion tank and permits locating the expansion tank at any height without regard to the elevation of the highest parts of the circulating system which the tank and valve serve; that is, it is not necessary to locate the tank higher than the highest heating unit with which it communicates, as would be the case in the absence of means for holding the valve with determined pressure on its seat. The tension of the spring will be adjusted also so as to resist some predetermined amount of pressure which may result from heating and expansion, thus in many situations making it a means of controlling the temperature to which the water may be raised before the pressure will find relief in the expansion tank.

When the pressure exceeds that for which the spring is adjusted, the valve member, B, is lifted and the water passes up in the shell around the valve member and thence up through the water-ways, $b^5$, between the threaded projections, $B^5$, to which the stop device is screwed, and thence on up through the outlet connection into the expansion tank. Upon cooling of the system, it is necessary that the water should return to prevent a partial vacuum which would cause air to be drawn in or undesirable inward pressure to be experienced at the various joints of the system, and other inconveniences which are known to result from such partial vacuum. Such return of the water is permitted by the described construction of the valve member, B, the water passing from the water-way in the shell outside the valve member in through the passage, $b^4$, of the bridge $B^4$, up past the check valve, D, thence down by way of the passage, $b^1$, into the lower chamber of said valve member and thence out through the axial aperture of the valve terminal, C, through the inlet, $A^1$, to the system.

The drawings show a convenient form of coupling for connecting the shell, A, with the expansion tank or pipe connections leading thereto, said fitting consisting of a reducing union, M, and customary form of coupling collar, N. These fittings are not an essential part of the device.

I claim:—

1. A pressure controlling and relief valve comprising a shell having a valve chamber, an inlet and outlet therefor and a valve seat around the inlet, a valve member positioned within such chamber out of contact therewith except at its seat, a stop on the shell and a spring reacting between the valve member and the stop member to hold the former yieldingly on the seat, said valve member having upper and lower chambers which communicate with each other and a hollow bridge which partially separates them, the lower chamber having communication through the valve terminal with the valve inlet and the upper chamber having communication through the hollow bridge with the valve chamber of the shell around the valve member, and a downwardly seating check valve in said upper chamber at the mouth of said last-mentioned passage.

2. A pressure controlling and relief valve comprising a shell having a valve chamber; an inlet and outlet therefor, and an inwardly facing valve seat around the inlet; a valve member within said chamber of less diameter than the interior of the chamber and thereby affording waterway passage at all sides, said member having an axially positioned cavity opening through its end at the inlet opening of the shell, and a bridge extending across said axial cavity positioned and proportioned to leave a waterway past it from its lower to its upper side, said bridge having a cavity extending through it from end to end opening at both ends within the waterway of the shell around the valve member, said bridge having an aperture in its upper side leading into the end-to-end cavity and an upwardly facing valve seat about said aperture, and a valve within the cavity of the valve member seating downwardly on said seat.

3. In a pressure controlling and relief valve device, in combination with a valve chamber having an inlet opening, a valve member seating at said inlet opening and having upper and lower chambers and a bridge between them past which they communicate with each other, the lower chamber having communication through the valve terminal with the inlet opening of the device, the bridge having a passage leading from the upper chamber out through the side of the valve member; a check valve in the upper chamber controlling said passage, said valve member comprising a removable cap which forms the top of the upper chamber and which protrudes thereinto for limiting the movement of the check valve away from its seat, said cap having a downwardly opening cavity which accommodates said movement of the valve.

In testimony whereof, I have hereunto set my hand at Chicago, Ill. this 17th day of July 1911.

GEORGE L. BOTTUM.

Witnesses:
LUCY I. STONE,
EDNA M. MACINTOSH.